(12) United States Patent
Hradecky

(10) Patent No.: US 9,951,602 B2
(45) Date of Patent: *Apr. 24, 2018

(54) IMPACT SENSING DURING JARRING OPERATIONS

(71) Applicant: Impact Selector International, LLC, Houma, LA (US)

(72) Inventor: Jason Allen Hradecky, The Woodlands, TX (US)

(73) Assignee: IMPACT SELECTOR INTERNATIONAL, LLC, Houma, LA (US)

( * ) Notice: Subject to any disclaimer, the term of this patent is extended or adjusted under 35 U.S.C. 154(b) by 527 days.

This patent is subject to a terminal disclaimer.

(21) Appl. No.: 14/639,504

(22) Filed: Mar. 5, 2015

(65) Prior Publication Data

US 2016/0258270 A1 Sep. 8, 2016

(51) Int. Cl.
*E21B 47/01* (2012.01)
*E21B 31/107* (2006.01)
*G01P 15/08* (2006.01)

(52) U.S. Cl.
CPC ............ *E21B 47/01* (2013.01); *E21B 31/107* (2013.01); *G01P 15/0891* (2013.01)

(58) Field of Classification Search
CPC .... E21B 31/1135; E21B 31/113; E21B 31/00; E21B 31/107; E21B 47/01; G01P 15/0891
See application file for complete search history.

(56) References Cited

U.S. PATENT DOCUMENTS

| | | |
|---|---|---|
| 4,607,692 A | 8/1986 | Zwart |
| 4,919,219 A | 4/1990 | Taylor |
| 5,022,473 A | 6/1991 | Taylor |
| 5,052,485 A | 10/1991 | Reid |
| 5,228,507 A | 7/1993 | Obrejanu et al. |
| 5,267,613 A | 12/1993 | Zwart et al. |
| 5,398,753 A | 3/1995 | Obrejanu et al. |
| 5,439,064 A | 8/1995 | Patton |
| 5,448,911 A | 9/1995 | Mason |
| 5,566,757 A | 10/1996 | Carpenter et al. |
| 5,589,825 A | 12/1996 | Pomerleau |
| 5,595,244 A | 1/1997 | Roberts |

(Continued)

FOREIGN PATENT DOCUMENTS

| | | |
|---|---|---|
| AU | 2013276979 B2 | 1/2014 |
| GB | 2340154 A | 2/2000 |
| WO | 2014120873 A1 | 8/2014 |

*Primary Examiner* — Yong-Suk Ro
(74) *Attorney, Agent, or Firm* — Boisbrun Hofman, PLLC

(57) ABSTRACT

A downhole tool having opposing interfaces for incorporation of the downhole tool into a downhole tool string. A housing extends between the opposing interfaces, and a bore extends longitudinally through the housing between the opposing interfaces. An accelerometer is disposed within the bore of the housing for detecting acceleration of the downhole tool in response to a mechanical impact generated elsewhere within the downhole tool string. The accelerometer generates an output signal indicative of the acceleration. The downhole tool also includes a processor for processing the output signal, a memory device for storing the output signal or data generated by the processor, and an electrical energy source powering the processor and the memory device.

20 Claims, 5 Drawing Sheets

(56) References Cited

U.S. PATENT DOCUMENTS

| | | |
|---|---|---|
| 5,602,541 A | 2/1997 | Comeau et al. |
| 5,660,238 A | 8/1997 | Earl et al. |
| 5,812,068 A | 9/1998 | Wisler et al. |
| 5,842,149 A | 11/1998 | Harrell et al. |
| 5,931,242 A | 8/1999 | Oettli |
| 6,006,844 A | 12/1999 | Puymbroeck et al. |
| 6,021,377 A | 2/2000 | Dubinsky et al. |
| 6,028,534 A | 2/2000 | Ciglenec et al. |
| 6,032,733 A | 3/2000 | Ludwig et al. |
| 6,119,777 A | 9/2000 | Runia |
| 6,173,793 B1 | 1/2001 | Thompson et al. |
| 6,176,325 B1 | 1/2001 | Rodger |
| 6,227,300 B1 | 5/2001 | Cunningham et al. |
| 6,233,524 B1 | 5/2001 | Harrell et al. |
| 6,290,004 B1 | 9/2001 | Evans |
| 6,389,890 B1 | 5/2002 | Sweetland et al. |
| 6,419,013 B1 | 7/2002 | Milne et al. |
| 6,481,495 B1 | 11/2002 | Evans |
| 6,488,085 B1 | 12/2002 | Milne et al. |
| 6,543,280 B2 | 4/2003 | Duhon |
| 6,550,322 B2 | 4/2003 | Sweetland et al. |
| 6,564,883 B2 | 5/2003 | Fredericks et al. |
| 6,577,244 B1 | 6/2003 | Clark et al. |
| 6,578,631 B2 | 6/2003 | Milne et al. |
| 6,619,395 B2 | 9/2003 | Spross |
| 6,631,563 B2 | 10/2003 | Brosnahan et al. |
| 6,640,899 B2 | 11/2003 | Day et al. |
| 6,655,460 B2 | 12/2003 | Bailey et al. |
| 6,662,110 B1 | 12/2003 | Bargach et al. |
| 6,662,645 B2 | 12/2003 | Brewer |
| 6,684,949 B1 | 2/2004 | Gabler et al. |
| 6,693,553 B1 | 2/2004 | Ciglenec et al. |
| 6,712,159 B2 | 3/2004 | Estes et al. |
| 6,725,932 B2* | 4/2004 | Taylor ............... E21B 31/107 166/177.6 |
| 6,755,257 B2 | 6/2004 | Spencer et al. |
| 6,836,218 B2 | 12/2004 | Frey et al. |
| 6,843,317 B2 | 1/2005 | Mackenzie |
| 6,848,517 B2 | 2/2005 | Wardley |
| 6,854,192 B2 | 2/2005 | Russell et al. |
| 6,857,487 B2 | 2/2005 | Galloway et al. |
| 6,885,308 B2 | 4/2005 | Smith et al. |
| 6,915,849 B2 | 7/2005 | Nuth |
| 6,943,697 B2 | 9/2005 | Ciglenec et al. |
| 6,944,545 B2 | 9/2005 | Close et al. |
| 6,948,560 B2 | 9/2005 | Marsh |
| 6,957,575 B2 | 10/2005 | Boucher et al. |
| 6,957,580 B2 | 10/2005 | Ekseth et al. |
| 6,988,551 B2 | 1/2006 | Evans |
| 7,000,692 B2 | 2/2006 | Hosie et al. |
| 7,002,484 B2 | 2/2006 | McElhinney |
| 7,025,130 B2 | 4/2006 | Bailey et al. |
| 7,044,238 B2 | 5/2006 | Hutchinson |
| 7,080,699 B2 | 7/2006 | Lovell et al. |
| 7,165,612 B2 | 1/2007 | McLaughlin |
| 7,168,508 B2 | 1/2007 | Goldberg et al. |
| 7,178,607 B2 | 2/2007 | Mayes et al. |
| 7,178,608 B2 | 2/2007 | Mayes et al. |
| 7,201,231 B2 | 4/2007 | Chaplin et al. |
| 7,215,125 B2 | 5/2007 | Clark |
| 7,264,055 B2 | 9/2007 | Mody et al. |
| 7,267,176 B2 | 9/2007 | Madden |
| 7,293,614 B2 | 11/2007 | Rose |
| 7,296,639 B2 | 11/2007 | Millar et al. |
| 7,311,149 B2 | 12/2007 | Evans |
| 7,316,278 B2 | 1/2008 | Hutchinson |
| 7,334,650 B2 | 2/2008 | Giroux et al. |
| 7,350,410 B2 | 4/2008 | Ekseth et al. |
| 7,363,967 B2 | 4/2008 | Welsey et al. |
| 7,367,397 B2* | 5/2008 | Clemens ............ E21B 31/107 166/178 |
| 7,407,006 B2 | 8/2008 | Wilson et al. |
| 7,420,475 B2 | 9/2008 | Adnan et al. |
| 7,510,008 B2 | 3/2009 | Evans |
| 7,513,305 B2 | 4/2009 | Wilson et al. |
| 7,532,129 B2 | 5/2009 | Radzinski |
| 7,533,724 B2 | 5/2009 | McLaughlin |
| 7,537,061 B2 | 5/2009 | Hall et al. |
| 7,540,337 B2 | 6/2009 | McLoughlin et al. |
| 7,555,391 B2 | 6/2009 | Gleitman |
| 7,591,314 B2 | 9/2009 | Sonnier et al. |
| 7,604,072 B2 | 10/2009 | Pastusek et al. |
| 7,607,478 B2 | 10/2009 | Martinez et al. |
| 7,661,475 B2 | 2/2010 | Sheiretov et al. |
| 7,688,674 B2 | 3/2010 | Underhill et al. |
| 7,730,967 B2 | 6/2010 | Ballantyne et al. |
| 7,801,704 B2 | 9/2010 | Sato et al. |
| 7,819,206 B2 | 10/2010 | Peter |
| 7,823,660 B2 | 11/2010 | Giroux et al. |
| 7,854,425 B2 | 12/2010 | Evans |
| 7,874,364 B2 | 1/2011 | Redlinger et al. |
| 7,880,640 B2 | 2/2011 | Lovell et al. |
| 7,896,074 B2 | 3/2011 | Bissonnette et al. |
| 7,905,282 B2 | 3/2011 | Bissonnette et al. |
| 7,921,937 B2 | 4/2011 | Brackin et al. |
| 7,962,288 B2 | 6/2011 | Gleitman |
| 7,986,145 B2 | 7/2011 | Sorbier et al. |
| 8,022,838 B2 | 9/2011 | Murphy |
| 8,024,957 B2 | 9/2011 | McKee |
| 8,025,105 B2 | 9/2011 | Templeton et al. |
| 8,042,616 B2 | 10/2011 | Giroux et al. |
| 8,065,085 B2 | 11/2011 | Ekseth et al. |
| 8,065,087 B2 | 11/2011 | Ekseth et al. |
| 8,087,477 B2 | 1/2012 | Sullivan et al. |
| 8,127,868 B2 | 3/2012 | Giroux et al. |
| 8,151,910 B2 | 4/2012 | Swinford |
| 8,169,337 B2 | 5/2012 | Evans et al. |
| 8,186,212 B2 | 5/2012 | Romero et al. |
| 8,191,639 B2 | 6/2012 | Howlett et al. |
| 8,220,541 B2 | 7/2012 | Martinez et al. |
| 8,256,509 B2 | 9/2012 | Evans |
| 8,272,441 B2 | 9/2012 | Umphries et al. |
| 8,286,702 B2 | 10/2012 | Umphries et al. |
| 8,286,703 B2 | 10/2012 | Clapp et al. |
| 8,286,710 B2 | 10/2012 | Chaplin et al. |
| 8,286,717 B2 | 10/2012 | Giroux et al. |
| 8,302,693 B2 | 11/2012 | Umphries et al. |
| 8,307,913 B2 | 11/2012 | Dolman et al. |
| 8,322,413 B2 | 12/2012 | Bishop et al. |
| 8,365,818 B2 | 2/2013 | Schultz et al. |
| 8,366,082 B2 | 2/2013 | Evans |
| 8,374,793 B2 | 2/2013 | Ekseth et al. |
| 8,407,006 B2 | 3/2013 | Gleitman |
| 8,417,495 B2 | 4/2013 | Daashevskiy |
| 8,433,517 B2 | 4/2013 | Ekseth et al. |
| 8,443,902 B2 | 5/2013 | Evans |
| 8,474,542 B2 | 7/2013 | Blanton et al. |
| 8,499,836 B2* | 8/2013 | Moriarty ............ E21B 31/107 166/178 |
| 8,511,392 B2 | 8/2013 | Howlett |
| 8,534,379 B2 | 9/2013 | Giroux et al. |
| 8,550,155 B2 | 10/2013 | Schultz et al. |
| 8,561,688 B2 | 10/2013 | Evans |
| 8,561,697 B2 | 10/2013 | Strickland |
| 8,567,515 B2 | 10/2013 | Giroux et al. |
| 8,581,740 B2 | 11/2013 | Hagen et al. |
| 8,636,060 B2 | 1/2014 | Hernandez |
| 8,655,596 B2 | 2/2014 | Ekseth et al. |
| 8,657,007 B1 | 2/2014 | Watson et al. |
| 8,689,867 B2 | 4/2014 | Strickland |
| 8,695,696 B2 | 4/2014 | Shoyhetman et al. |
| 8,695,701 B2 | 4/2014 | Constantinou et al. |
| 8,720,554 B2 | 5/2014 | Clapp et al. |
| 8,733,438 B2 | 5/2014 | Kenison et al. |
| 8,773,134 B2 | 7/2014 | Sorbier et al. |
| 8,783,343 B2 | 7/2014 | Giroux et al. |
| 8,789,598 B1* | 7/2014 | Mlcak ............... E21B 31/107 166/178 |
| 8,813,876 B2 | 8/2014 | Sallwasser et al. |
| 8,866,632 B2 | 10/2014 | Hrametz et al. |
| 8,950,477 B2 | 2/2015 | Vagapov et al. |
| 9,631,446 B2* | 4/2017 | Hradecky ........... E21B 31/107 |
| 2001/0018974 A1* | 9/2001 | Mouton ............. E21B 31/113 166/301 |

(56) References Cited

U.S. PATENT DOCUMENTS

| | | |
|---|---|---|
| 2002/0112866 A1 | 8/2002 | Buyers et al. |
| 2003/0147360 A1 | 8/2003 | Nero et al. |
| 2004/0045351 A1 | 3/2004 | Skinner |
| 2006/0054354 A1 | 3/2006 | Orban |
| 2006/0070734 A1 | 4/2006 | Zillinger et al. |
| 2009/0173538 A1 | 7/2009 | Estes et al. |
| 2009/0266544 A1 | 10/2009 | Redlinger et al. |
| 2011/0083845 A1 | 4/2011 | McLaughlin |
| 2011/0297380 A1 * | 12/2011 | Alberty ............. E21B 31/113 166/301 |
| 2012/0067594 A1 | 3/2012 | Noske et al. |
| 2012/0152519 A1 | 6/2012 | Rodgers et al. |
| 2013/0168092 A1 | 7/2013 | Evans |
| 2013/0211723 A1 | 8/2013 | Weston et al. |
| 2013/0213128 A1 | 8/2013 | Gleitman |
| 2013/0277057 A1 | 10/2013 | Evans |
| 2014/0224538 A1 | 8/2014 | Brown et al. |
| 2014/0240140 A1 | 8/2014 | Switzer et al. |
| 2014/0251602 A1 | 9/2014 | Kenison et al. |
| 2014/0262515 A1 | 9/2014 | Konschuh et al. |
| 2014/0265565 A1 | 9/2014 | Cooley et al. |
| 2014/0340990 A1 | 11/2014 | Chen et al. |

\* cited by examiner

IMPACT SENSING DURING JARRING OPERATIONS

BACKGROUND OF THE DISCLOSURE

Drilling operations have become increasingly expensive as the need to drill deeper, in harsher environments, and through more difficult materials has become a reality. In addition, testing and evaluation of completed and partially finished wellbores has become commonplace, such as to increase well production and return on investment. Consequently, in working with deeper and more complex wellbores, it becomes more likely that tools, tool strings, and/or other downhole equipment may become stuck within the wellbore.

A downhole tool, often referred to as a jarring tool, may be operable to dislodge the downhole equipment when it becomes stuck. The jarring tool may be included as part of the tool string and deployed downhole along with the downhole equipment, or the jarring tool may be deployed downhole to free the downhole equipment after it becomes stuck. Tension may be applied to the deployed tool string via a conveyance means to trigger the jarring tool and, thus, deliver an impact intended to dislodge the stuck downhole equipment.

Predicting the actual magnitude and other parameters associated with the impact realized at a downhole location is difficult due to many factors. Although the tension applied to the conveyance means at the surface of the wellbore may be within intended or predetermined ranges, the impacts delivered downhole by the jarring tool to the stuck downhole equipment may be less than intended or otherwise not as expected. Factors such as depth of the jarring tool, elastic properties and weight of the conveyance means and the tool string, including the jarring tool and the stuck downhole equipment, wellbore deviation, and friction forces caused by contact with sides of the wellbore and/or obstructions within the wellbore, may affect the actual impact to the tool string realized at the downhole location. Due to these factors, measuring the magnitude and other parameters of the impact realized at the downhole location using surface sensors or indicators is limited and unreliable.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
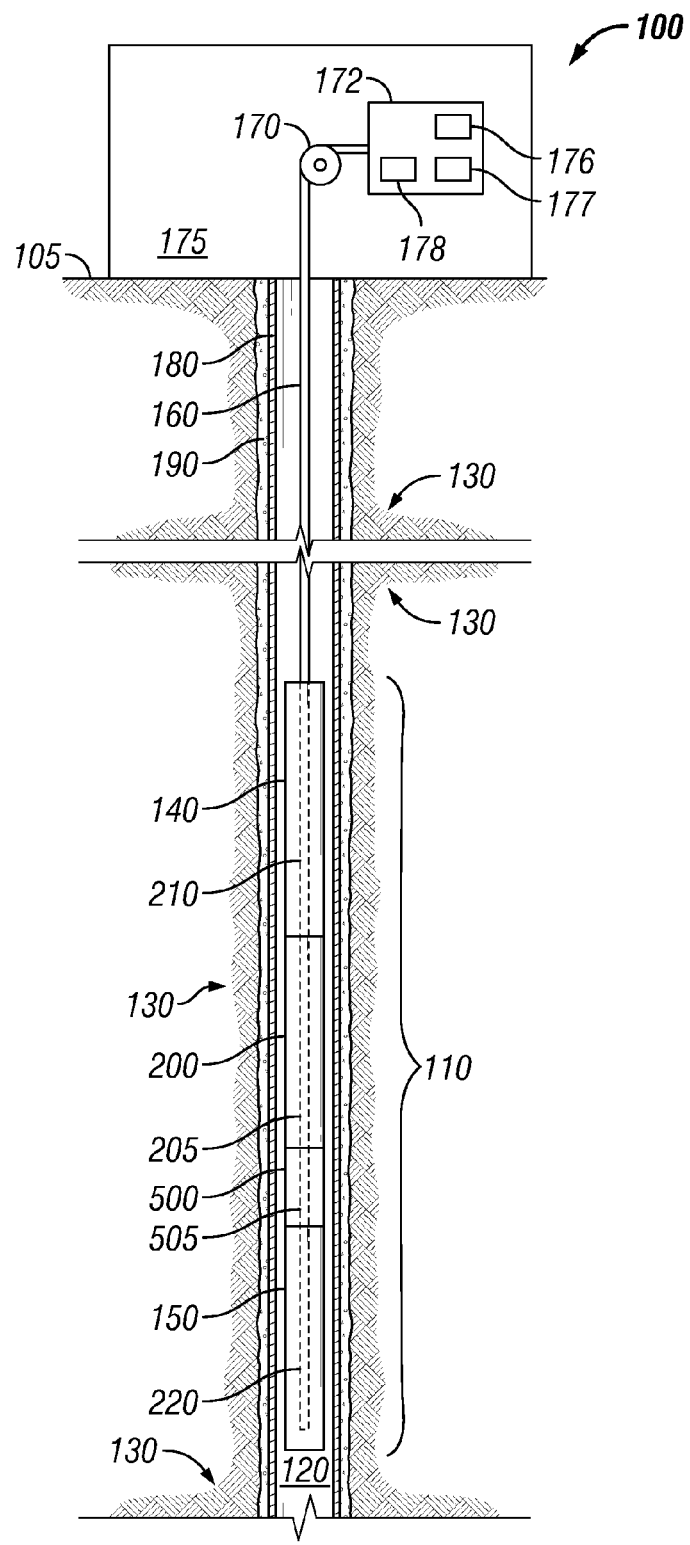
FIG. 1 is a schematic side view of at least a portion of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

FIG. 1 is a schematic view of at least a portion of a wellsite system 100 according to one or more aspects of the present disclosure. The wellsite system 100 may comprise a tool string 110 suspended within a wellbore 120 that extends from a wellsite surface 105 into one or more subterranean formations 130. The wellbore 120 is depicted as being a cased-hole implementation comprising a casing 180 secured by cement 190. However, one or more aspects of the present disclosure are also applicable to and/or readily adaptable for utilizing in open-hole implementations lacking the casing 180 and cement 190. The tool string 110 may be suspended within the wellbore 120 via conveyance means 160 operably coupled with a tensioning device 170 and/or other surface equipment 175 disposed at the wellsite surface 105, including a power and control system 172. The tool string 110 may comprise a first portion 140, a second portion 150, and a jarring tool 200 coupled between the first portion 140 and the second portion 150. The tool string 110 may further comprise a sensor tool 500 coupled between the jarring tool 200 and the second portion 150. However, as described below, the sensor tool 500 may be coupled at another location within the tool string 110, such as between the jarring tool 200 and the first portion 140.

The jarring tool 200 and the sensor tool 500 are each implemented as single downhole tools. In the context of the present disclosure, a "single downhole tool" may be that which includes no more than two interfaces that are capable of being operably coupled or "made-up" with other downhole tools to form the tool string 110. Thus, coupling the jarring tool 200 with the sensor tool 500 does not result in a "single downhole tool" because such assembly would have four interfaces that are capable of being coupled with other downhole tools to form the tool string 110—namely, the two interfaces of the jarring tool 200 and the two interfaces of the sensor tool 500. Accordingly, assembling the jarring tool 200 with the sensor tool 500 results in two downhole tools instead of a "single downhole tool."

The tensioning device 170 is operable to apply an adjustable tensile force to the tool string 110 via the conveyance means 160. The tensioning device 170 may be, comprise, or form at least a portion of a crane, winch, drawworks, top drive, and/or other lifting device coupled to the tool string 110 by the conveyance means 160. The conveyance means 160 may be or comprise a wireline, slickline, e-line, coiled tubing, drill pipe, production tubing, and/or other conveyance means, and may comprise and/or be operable in conjunction with means for communication between the tool string 110, the tensioning device 170, and/or one or more other portions of the surface equipment 175, including the power and control system 172. The conveyance means 160 may comprise a multi-conductor wireline and/or other electrical conductor(s) extending between the tool string 110 and the surface equipment 175. The power and control system 172 may include a source of electrical power 176, a memory device 177, and a controller 178 operable to receive and process electrical signals from the tool string 110 and/or commands from a surface operator.

The first and second portions 140, 150 of the tool string 110 may each be or comprise one or more downhole tools, modules, and/or other apparatus operable in wireline, while-drilling, coiled tubing, completion, production, and/or other implementations. The first portion 140 of the tool string 110 may comprise at least one electrical conductor 145 in electrical communication with at least one component of the surface equipment 175. The second portion 150 of the tool string 110 may also comprise at least one electrical conductor 155 in electrical communication with at least one component of the surface equipment 175, wherein the at least one electrical conductor 145 and the at least one electrical conductor 155 may be in electrical communication via at least one or more electrical conductors 205, 505 of the jarring tool 200 and the sensor tool 500, respectively. Thus, the electrical conductors 145, 155, 205, 505 may connect with and/or form a portion of the conveyance means 160, and may include various electrical connectors and/or interfaces along such path, including as described below.

Each of the electrical conductors 145, 155, 205, 505 and/or others may comprise a plurality of individual conductors, such as may facilitate electrical communication of the first portion 140 of the tool string 110, the jarring tool 200, the sensor tool 500, and the second portion 150 of the tool string 110 with at least one component of the surface equipment 175, such as the power and control system 172. For example, the conveyance means 160 and the electrical conductors 145, 155, 205, 505 may be operable to transmit and/or receive electrical power, data, and/or control signals between the power and control system 172 and one or more of the first portion 140, the jarring tool 200, the sensor tool 500, and the second portion 150. The electrical conductors 145, 155, 205, 505 may further facilitate electrical communication between two or more of the first portion 140, the jarring tool 200, the sensor tool 500, and the second portion 150.

The jarring tool 200 is operable to dislodge a portion of the tool string 110 that has become lodged or stuck within the wellbore 120, such as the second portion 150. Thus, the jarring tool 200 and the sensor tool 500 are coupled into the tool string 110 before the tool string 110 is conveyed into the wellbore.

Figure 2:
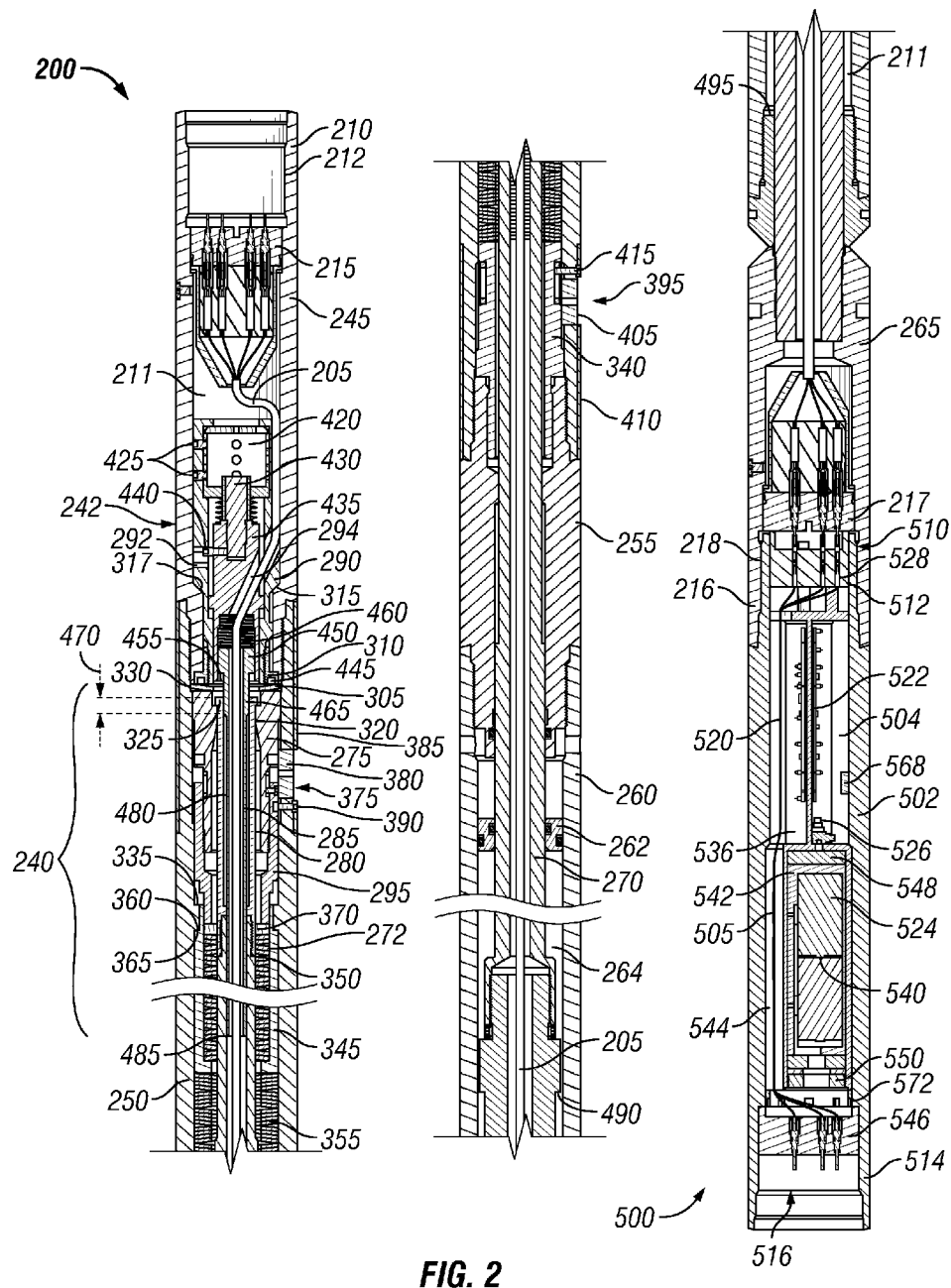
FIG. 2 is a sectional side view of a portion of an example implementation of a portion of the apparatus shown in FIG. 1 according to one or more aspects of the present disclosure.

FIG. 2 is a sectional view of an example implementation of the jarring tool 200 and the sensor tool 500 shown in FIG. 1 according to one or more aspects of the present disclosure. Referring to FIGS. 1 and 2, collectively, the jarring tool 200 comprises the electrical conductor 205 in electrical communication with the electrical conductor 145 of the first portion 140 of the tool string 110 and in electrical communication with the electrical conductor 505 of the sensor tool 500. The electrical conductor 505 of the sensor tool 500 is in electrical communication with the electrical conductor 155 of the second portion 150 of the tool string 110.

For example, the jarring tool 200 may comprise one or more uphole (hereinafter "upper") electrical connectors 215 and one or more downhole (hereinafter "lower") electrical connectors 217 in electrical communication with the electrical conductor 205 extending therebetween. The upper electrical connector 215 may electrically connect with a corresponding lower electrical connector (not shown) of the first portion 140 of the tool string 110, wherein the lower electrical connector of the first portion 140 may be in electrical connection with the electrical conductor 145. The sensor tool 500 may comprise an upper interface 510 at an upper end of the sensor tool 500 and a lower interface 516 at an opposing lower end of the sensor tool 500. The upper interface 510 may comprise an upper electrical connector 528 and upper mechanical fastening means 512, and the lower interface 516 may comprise a lower electrical connector 546 and lower mechanical fastening means 514. The upper electrical connector 528 and the lower electrical connector 546 may be in electrical connection via the electrical conductor 505 extending therebetween. The lower electrical connector 217 of the jarring tool 200 may electrically connect with the upper electrical connector 528, and the lower electrical connector 546 may electrically connect with a corresponding upper electrical connector (not shown) of the second portion 150, wherein the upper electrical connector of the second portion 150 is in electrical connection with the electrical conductor 155. Accordingly, the electrical conductor 145 of the first portion 140 of the tool string 110 may be in electrical communication with the electrical conductor 155 of the second portion 150 of the tool string 110 via the electrical conductor 205 of the jarring tool 200, the electrical conductor 505 of the sensor tool 500, and one or more electrical connectors 215, 217, 528, 546. Consequently, the electrical conductor 145 of the first portion 140 of the tool string 110, the electrical conductor 205 of the jarring tool 200, the electrical conductor 505 of the sensor tool 500, and the electrical conductor 155 of the second portion 150 of the tool string 110, including via one or more additional electrical connectors 215, 217, 528, 546, may be in electrical communication with the surface equipment 175, such as via the conveyance means 160.

The jarring tool 200 and/or associated apparatus may be operable to detect an electrical characteristic of the electrical conductor 205, impart a first impact force on the second portion 150 of the tool string 110 when the electrical characteristic is detected, and impart a second impact force on the second portion 150 of the tool string 110 when the electrical characteristic is not detected. The second impact force may be substantially greater than or otherwise different from the first impact force. For example, the first impact force may be about 3,500 pounds (or about 15.6 kilonewtons), whereas the second impact force may be about 9,000 pounds (or about 40.0 kilonewtons). However, other quantities are also within the scope of the present disclosure. For example, the first impact force may range between about 1,000 pounds (or about 4.4 kilonewtons) and about 6,000 pounds (or about 26.7 kilonewtons), and the second impact force may range between about 6,000 pounds (or about 26.7 kilonewtons) and about 12,000 pounds (or about 53.4 kilonewtons). A difference between the first and second impact forces may range between about 1,000 pounds (or about 4.4 kilonewtons) and about 6,000 pounds (or about 26.7 kilonewtons), although other differences are also within the scope of the present disclosure.

The electrical characteristic detected by the jarring tool 200 may be a substantially non-zero voltage and/or current, such as in implementations in which the electrical characteristic is a voltage substantially greater than about 0.01 volts and/or a current substantially greater than about 0.001 amperes. For example, the electrical characteristic may be a voltage substantially greater than about 0.1 volts and/or a current substantially greater than about 0.01 amperes. However, other values are also within the scope of the present disclosure.

As at least partially shown in FIG. 2, the jarring tool 200 may further comprise an upper housing 242, which may include a first upper housing portion 245, a second upper housing portion 250 coupled to the first upper housing portion 245, a connector 255 coupled to the second upper housing portion 250 opposite the first upper housing portion 245, and a third upper housing portion 260 coupled to the connector 255 opposite the second upper housing portion 250. The several portions of the upper housing 242 comprise a central bore 211 extending therethrough, such as may be operable to contain therein the upper electrical connector 215 and other components, as described below.

The jarring tool 200 may further comprise a lower housing 265 coupled to the sensor tool 500, and a shaft 270 extending between the lower housing 265 and the upper housing 242. The shaft 270 may be fixedly coupled with the lower housing 265 and slidably coupled with the upper housing 242, wherein the shaft 270 and the upper housing 242 move axially relative to each other. The shaft 270 extends into the third upper housing portion 260, the connector 255, and the second upper housing portion 250, and terminates at a latching mechanism 240. An upper end 210 of the upper housing 242 includes an interface comprising upper mechanical fastening means 212 for coupling with a corresponding interface of the first portion 140 of the tool string 110. A lower end 216 of the lower housing 265 includes an interface comprising lower mechanical fastening means 218 for coupling with an interface comprising upper mechanical fastening means 512 of a housing 502 of the sensor tool 500. The upper and lower mechanical fastening means 212, 218 may comprise internal or external threads, one or more fasteners, box-pin couplings, other oil field component field joints and/or coupling means, and/or other means known in the art.

The latching mechanism 240 may comprise a female latch portion 275, a male latch portion 280, and an anti-release member 285. The female latch portion 275 may be slidably retained within the second upper housing portion 250 between a detector housing 290 and at least a portion of an upper adjuster 295. A floating separator 305 may be disposed between the female latch portion 275 and the detector housing 290. In the depicted implementation, the separator 305 is a Belleville washer retained between the female latch portion 275 and a lock ring 310. The lock ring 310 may be threadedly engaged with the detector housing 290 to retain mating engagement between corresponding conical or otherwise tapered mating surfaces 315 external to the detector housing 290 with corresponding conical or otherwise tapered mating surfaces 317 internal to the first upper housing portion 245, thus positionally fixing the detector housing 290 relative to the first upper housing portion 245.

The male latch portion 280 comprises a plurality of flexible members 320 collectively operable to detachably engage the female latch portion 275. While only two instances are visible in the figures, a person having ordinary skill in the art will readily recognize that more than two instances of the flexible member 320 collectively encircle the anti-release member 285. The male latch portion 280 is coupled to or otherwise carried with the shaft 270, such as via threaded means, fasteners, pins, press/interference fit, and/or other coupling 272. Thus, the female latch portion 275 is carried with and/or by the upper housing 242 and, thus, the first or upper portion 140 of the tool string 110, whereas the male latch portion 280 is carried with and/or by the lower housing 265 and, thus, the sensor tool 500 and the second or lower portion 150 of the tool string 110. The detachable engagement between the female and male latch portions 275, 280 is between an internal profile 325 of the female latch portion 275 and an external profile 330 of each of the plurality of flexible members 320.

The anti-release member 285 is moveable within the male latch portion 280 between a first position, defining a first configuration of latching mechanism 240, shown in FIG. 2, corresponding to when the jarring tool 200 detects the electrical characteristic on the electrical conductor 205, and a second position (not shown), defining a second configuration of the latching mechanism 240, wherein the external profile 330 is disengaged from and disposed below the internal profile 325, corresponding to when the jarring tool 200 does not detect (or detects the absence of) the electrical characteristic on the electrical conductor 205. The anti-release member 285 prevents radially inward deflection of the plurality of flexible members 320 and, thus, disengagement of the female and male latch portions 275, 280 when the tensile force applied across the latching mechanism 240 is substantially less than the first impact force when the anti-release member 285 is in the first position, and substantially less than the second impact force when the anti-release member 285 is moved downwards to the second position. Such operation is described in greater detail below.

The upper adjuster 295 is threadedly engaged with the female latch portion 275, such that the upper adjuster 295 and the female latch portion 275 float axially between, for example, the lock ring 310 and an internal shoulder 335 of the second upper housing portion 250, and such that rotation of the female latch portion 275 relative to the upper adjuster 295 adjusts the relative axial positions of the female latch portion 275 and the upper adjuster 295. The jarring tool 200 also comprises a lower adjuster 340 disposed within the second upper housing portion 250 and threadedly engaged with the connector 255, such that the axial position of the lower adjuster 340 is adjustable in response to rotation of the lower adjuster 340 relative to the connector 255 and/or the second upper housing portion 250. The jarring tool 200 also comprises a carrier 345 slidably retained within the second upper housing portion 250, an upper spring stack 350 slidably disposed within the annulus defined within the carrier 345 by the shaft 270 and/or the male latch portion 280, and a lower spring stack 355 slidably retained between the carrier 345 and the lower adjuster 340. The upper and lower spring stacks 350, 355 may each comprise one or more Belleville washers, wave springs, compression springs, and/or other biasing members operable to resist contraction in an axial direction.

The lower spring stack 355 biases the carrier 345 away from the lower adjuster 340 in an upper direction, ultimately urging an upper-facing shoulder 360 of the carrier 345 towards contact with a corresponding, downhole-facing, interior shoulder 365 of the second upper housing portion 250. The upper spring stack 350 biases the upper adjuster 295 away from the carrier 345 (perhaps via one or more contact rings, washers, and/or other annular members 370), thus urging the interior profile 325 of the female latching portion 275 into contact with the exterior profile 330 of the plurality of flexible members 320, when the anti-release member 285 is positioned within the ends of the flexible members 320. The upper spring stack 350 also urges the female latching portion 275 (via the adjuster 295) towards contact with the separator 305, when permitted by engagement between the female and male latch portions 275, 280.

Thus, as explained in greater detail below: (1) the lower adjuster 340 is disposed in the second upper housing portion 250 at an axial location that is adjustable relative to the second upper housing portion 250 in response to rotation of the lower adjuster 340 relative to the second upper housing portion 250, (2) the upper spring stack 350 is operable to resist relative movement (and thus disengagement) of the female and male latch portions 275, 280, and (3) the lower spring stack 355 is also operable to resist relative movement (and thus disengagement) of the female and male latch portions 275, 280, wherein: (A) the female latch portion 275 is axially fixed relative to the second upper housing portion 250, (B) the male latch portion 280 is axially fixed relative to the second upper housing portion 250, (C) the difference between a first magnitude of the first impact force and a second magnitude of the second impact force is adjustable via adjustment of the relative locations of the female latch portion 275 and the upper adjuster 295 in response to relative rotation of the female latch portion 275 and the upper adjuster 295, and (D) the second magnitude of the second impact force is adjustable in response to adjustment of the location of the lower, "static" end of the lower spring stack 355 relative to the second upper housing portion 250, which is accomplished by adjusting the location of the lower adjuster 340 via rotation relative to the second upper housing portion 250 and/or connector 255.

Rotation of the female latch portion 275 relative to the second upper housing portion 250 may be via external access through an upper window 375 extending through a sidewall of the second upper housing portion 250. The upper window 375 may be closed during operations via one or more of: a removable member 380 sized for receipt within the window 375; and a rotatable cover 385 having an opening (not numbered) that reveals the window 375 when rotationally aligned to do so but that is also rotatable away from the window 375 such that the cover 385 obstructs access to the window 375. A fastener 390 may prevent rotation of the cover 385 during operations.

Rotation of the lower adjuster 340 relative to the second upper housing portion 250 may be via external access through a lower window 395 extending through a sidewall of the second upper housing portion 250. The lower window 395 may be closed during operations via one or more of: a removable member 405 sized for receipt within the window 395; and a rotatable cover 410 having an opening (not numbered) that reveals the window 395 when rotationally aligned to do so but that is also rotatable away from the window 395 such that the cover 410 obstructs access to the window 395. A fastener 415 may prevent rotation of the cover 410 during operations.

The detector housing 290 contains, for example, a detector 420 operable to detect the electrical characteristic based upon which the higher or lower impact force is imparted by the jarring tool 200 to the second tool string portion 150 (via the sensor tool 500). For example, as described above, the detector 420 may be operable to detect the presence of current and/or voltage on the electrical conductor 205, such as in implementations in which the detector is and/or comprises a transformer, a Hall effect sensor, a Faraday sensor, a magnetometer, and/or other devices operable in the detection of current and/or voltage. The detector 420 may be secured within the detector housing 290 by one or more threaded fasteners, pins, and/or other means 425.

The detector 420 also is, comprises, and/or operates in conjunction with a solenoid, transducer, and/or other type of actuator operable to move the anti-release member 285 between the first position (shown in FIG. 2) and the second position (not shown), below the first position, based on whether the electrical characteristic sensor of the detector 420 detects the electrical characteristic. In the example implementation depicted in FIG. 2, such actuator comprises a plunger 430 extending from the detector 420 and coupled to a mandrel 435 that slides axially with the plunger 430 inside the detector housing 290. The plunger 430 and mandrel 435 may be coupled via one or more threaded fasteners, pins, and/or other means 440, which may slide within a slot 292 extending through a sidewall of the detector housing 290. The mandrel 435 includes a recess 445 within which a retaining ring and/or other means 455 retains a head 450 of the anti-release member 285. A spring and/or other biasing member 460 disposed within the recess 445 urges the head 450 of the anti-release member 285 towards the retaining means 455 and/or otherwise resists upward movement of the anti-release member 285 relative to the mandrel 435.

The detector housing 290 and the mandrel 435 may each comprise one or more passages 294 through which the electrical conductor 205 may pass and then extend through the anti-release member 285 and the shaft 270. Accordingly, the electrical conductor 205 may be in electrical communication with the electrical conductors 505, 155 of the sensor tool 500 and the second tool string portion 150, respectively.

The anti-release member 285 may comprise multiple sections of different diameters. For example, the head 450 of the anti-release member 285 may have a diameter sized for receipt within the recess 445 of the mandrel 435 and containment therein via the retaining means 455. For example, a blocking section 465 of the anti-release member 285 may have a diameter sized for receipt within the male latch portion 280 (e.g., within the plurality of flexible members 320), such that the anti-release member 285 prevents disengagement of the female and male latch portions 275, 280 when the blocking section 465 is positioned within the male latch portion 280. For example, the blocking section 465 of the anti-release member 285 may be sufficiently sized and/or otherwise configured such that, when positioned within the ends of the plurality of flexible members 320, the flexible members 320 are prevented from deflecting radially inward in response to contact between the inner profile 325 of the female latch portion 275 and the outer profile 330 of each of the flexible members 320 of the male latch portion 280.

The detector 420, the plunger 430, the mandrel 435, and the biasing member 460 may also cooperatively operate to axially translate the anti-release member 285 between its first and second positions described above. For example, in the example implementation and operational stage depicted in FIG. 2, the blocking section 465 of the anti-release member 285 is positioned in the first position, including within the flexible members 320 of the male latch portion 280, such that the blocking section 465 of the anti-release member 285 prevents the radially inward deflection of the flexible members 320, and thus prevents the disengagement of the female and male latch portions 275, 280 until the tensile force applied across the jarring tool 200 sufficiently overcomes the biasing force(s) of the upper and/or lower spring stacks 350, 355. That is, to disengage the female and male latch portions 275, 280, the tensile force applied across the jarring tool 200 is increased by an amount sufficient to cause relative translation between the blocking section 465 of the anti-release member 285 and the male latch portion 280 by at least a distance 470 sufficient to remove the blocking section 465 of the anti-release member 285 from the ends of the flexible members 320 of the male latch portion 280, thereby permitting the radially inward deflection of the ends of the flexible members 320 and, thus, their disengagement from the female latch portion 275.

In the example implementation depicted in FIG. 2, the distance 470 is about 0.5 inches (or about 1.3 centimeters).

However, the distance 470 may range between about 0.2 inches (or about 0.8 centimeters) and about 2.0 inches (or about 5.1 centimeters) within the scope of the present disclosure, and may also fall outside such range while nonetheless remaining within the scope of the present disclosure.

In another implementation and/or operational stage, the detector 420, the plunger 430, the mandrel 435, and/or the biasing member 460 may cooperatively translate the anti-release member 285 to its second position, such as in response to the detector 420 detecting a current, voltage, and/or other electrical characteristic of the electrical conductor 205. Consequently, the blocking section 465 of the anti-release member 285 may be positioned further inside (i.e., further downward) the male latch portion 280 relative to the first configuration depicted in the implementation/operational stage shown in FIG. 2. Accordingly, the distance 470 may be increased due to relative axial translation between the blocking section 465 and the ends of the flexible members 320 of the male latch portion 280. For example, the distance 470 may increase to about 0.8 inches (or about 2.0 centimeters). However, the increased distance 470 may range between about 0.3 inches (or about 0.8 centimeters) and about 4.0 inches (or about 10.1 centimeters) within the scope of the present disclosure, and may also fall outside such range while nonetheless remaining within the scope of the present disclosure.

As described above, the detector 420, the plunger 430, the mandrel 435, and/or the biasing member 460 may be collectively operable to move the blocking section 465 of the anti-release member 285 from the first position to (or at least towards) the second position. However, the detector 420, the plunger 430, the mandrel 435, and/or the biasing member 460 may also be collectively operable to return the blocking section 465 of the anti-release member 285 from the second position to (or at least towards) the first position. To facilitate such movement, the anti-release member 285 may also comprise an aligning section 480 having a diameter at least small enough to permit sufficient radially inward deflection of the ends of the flexible members 320, such as to consequently permit disengagement of the female and male latch portions 275, 280. The length of the aligning section 480 may vary within the scope of the present disclosure, but may generally be long enough that the end 485 of the anti-release member 285 remains within the male latch portion 280 and/or the shaft 270 during operation of the jarring tool 200.

The detector 420, the plunger 430, the mandrel 435, and/or the biasing member 460 may also be collectively operable to move the blocking section 465 of the anti-release member 285 to a third position between the first position and the second position. For example, the detector 420 may be operable to measure a quantitative value of the electrical characteristic of the electrical conductor 205, instead of (or in addition to) merely detecting the presence or absence of the electrical characteristic. Consequently, the extent to which the detector 420, the plunger 430, the mandrel 435, and/or the biasing member 460 collectively operate to move the blocking section 465 may be based on the measured quantitative value of the electrical characteristic of the electrical conductor 205. For example, the detector 420, the plunger 430, the mandrel 435, and/or the biasing member 460 may collectively operate to position the blocking section 465 of the anti-release member 285 in: (1) the first position when the electrical characteristic of the electrical conductor 205 measured by the detector 420 is greater than a first predetermined level (e.g., a first predetermined current and/or voltage), (2) the second position when the electrical characteristic of the electrical conductor 205 measured by the detector 420 is zero or less than a second predetermined level (e.g., a second predetermined current and/or voltage), and (3) a third position between the first and second positions. The third position may be a single predetermined position between to the first and second positions, or may be one of multiple predetermined positions each corresponding to a quantitative interval between the first and second predetermined levels.

The detector 420, the plunger 430, the mandrel 435, and/or the biasing member 460 may also or instead collectively operate to position the blocking section 465 of the anti-release member 285 at a third position offset between the first and second positions by an amount proportional to the difference between the measured electrical characteristic and the first and second predetermined levels. For example, if the first predetermined level is ten (10) units (e.g., volts or amperes), the second predetermined level is zero (0) units, the measured electrical characteristic is three (3) units, and the distance between the first and second positions is about ten (10) centimeters, then the third position may be about three (3) centimeters from the second position, which is also about seven (7) centimeters from the first position.

FIG. 2 also depicts a floating piston 262 disposed within the annulus 264 defined between the outer profile of the shaft 270 and the inner profile of the third upper housing portion 260. The floating piston 262 may fluidly isolate a lower portion of annulus 264 below the floating piston 262 from an upper portion of the annulus 264. At least a portion of the annulus 264 may thus be utilized for pressure compensation of wellbore fluid and/or hydraulic oil contained within the jarring tool 200.

Figure 3:
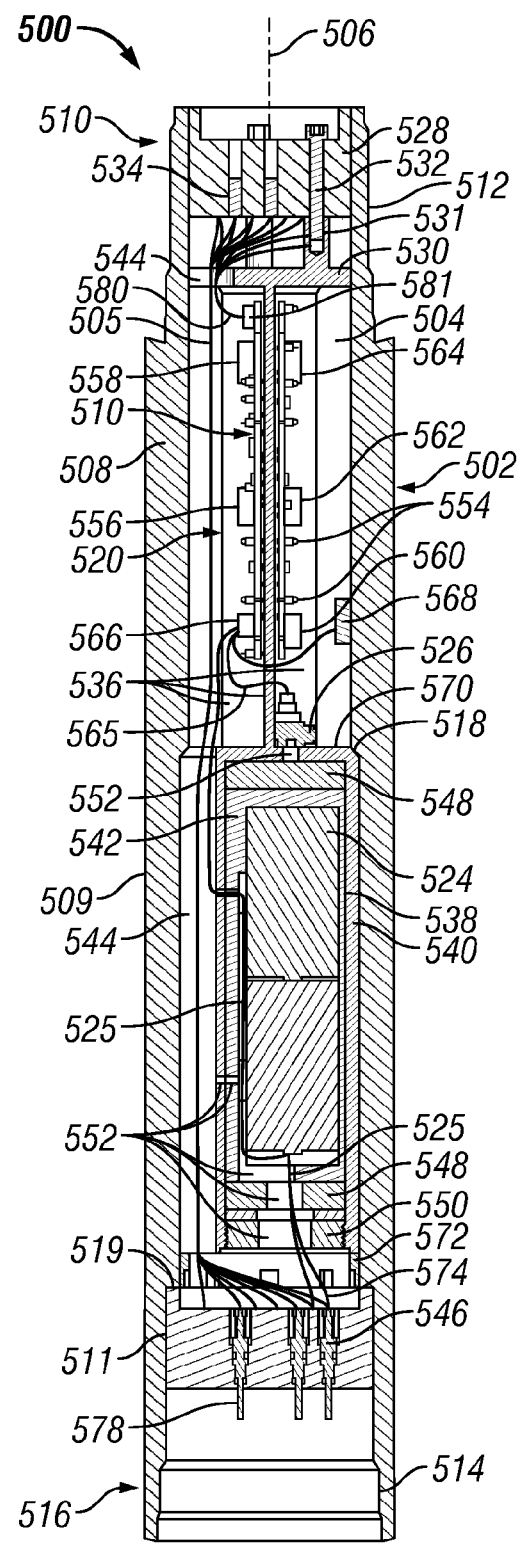
FIG. 3 is an enlarged sectional side view of a portion of the apparatus shown in FIG. 2 according to one or more aspects of the present disclosure.
Figure 4:
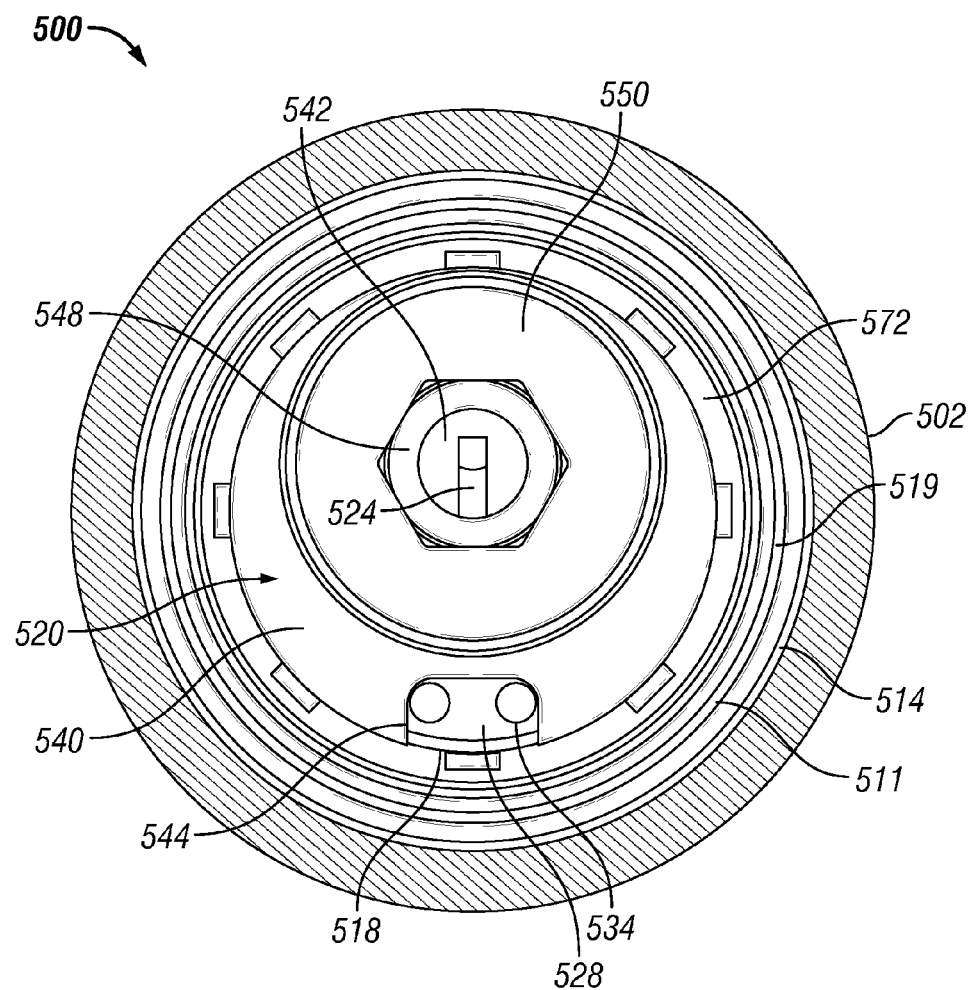
FIG. 4 is a bottom view of the apparatus shown in FIG. 3 according to one or more aspects of the present disclosure.

FIG. 3 is a sectional view of an example implementation of the sensor tool 500 shown in FIGS. 1 and 2 according to one or more aspects of the present disclosure. FIG. 4 is a bottom view of the sensor tool 500 shown in FIG. 3. For simplicity and clarity, FIG. 4 omits the lower electrical connector 546 to facilitate an improved view of some portions of the sensor tool 500.

Referring to FIGS. 1-4, collectively, the housing 502 of the sensor tool 500 may have a substantially tubular configuration. The housing 502 may comprise a first inner surface 508, a second inner surface 509, and a third inner surface 511 collectively defining a substantially cylindrical bore 504 (or multiple contiguous bores) extending longitudinally through the housing 502 along a central axis 506 of the sensor tool 500. The second inner surface 509 may comprise an inner diameter that is larger than an inner diameter of the first inner surface 508, and the third inner surface 511 may comprise an inner diameter that is larger than the inner diameter of the second inner surface 509. The housing 502 may further comprise a first shoulder 518 at the transition between the first inner surface 508 and the second inner surface 509, and a second shoulder 519 at the transition between the second inner surface 509 and the third inner surface 511. The first shoulder 518 may protrude radially into the bore 504 from the second inner surface 509 and extend circumferentially between the first and second inner surfaces 508, 509. The second shoulder 519 may protrude radially into the bore 504 from the third inner surface 511 and extend circumferentially between the second and third inner surfaces 509, 511.

The upper mechanical fastening means 512, located at the upper interface of the housing 502, may be operable to couple the sensor tool 500 with the lower mechanical fastening means 218 of the lower interface of the lower housing 265 of the jarring tool 200 or with another portion of the tool string 110. Although the upper mechanical fastening means 512 is shown as an external thread engaging the lower mechanical fastening means 218 of the jarring tool 200, other implementations of the upper mechanical fastening means 512 may include one or more fasteners, box-pin couplings, other oil field component field joints and/or coupling means, and/or other mechanical fastening means and/or interfaces known in the art. The lower mechanical fastening means 514, located at the lower interface of the housing 502, may be operable to couple the sensor tool 500 with the second portion 150 of the tool string 110 or with another portion of the tool string 110. Although the lower mechanical fastening means 514 is shown as an internal thread operable to threadedly engage a corresponding external thread (not shown), other implementations of the lower mechanical fastening means 514 may include one or more fasteners, box-pin couplings, other oil field component field joints and/or coupling means, and/or other mechanical fastening means and/or interfaces known in the art.

The sensor tool 500 further comprises an internal framing or support assembly, referred to herein as a chassis 520, to support or maintain one or more electronics boards 522, a power source 524, an accelerometer 526, and an upper electrical connector 528 in corresponding predetermined positions within the bore 504 of the housing 502. For example, an upper end of the chassis 520 may comprise a support member 530 that may aid in maintaining at least a portion of the chassis 520 centralized within the central bore 504 of the housing 502. The support member 530 may also function as a mounting bracket or surface, such as may maintain the upper electrical connector 528 in a predetermined position at or near the upper interface of the sensor tool 500. The support member 530 may comprise a plate or another member having a substantially cylindrical shape or otherwise have a curved outer surface that may facilitate contact with the cooperatively curved first inner surface 508 of the housing 502. The support member 530 may comprise an outer diameter that is sufficiently smaller than the inner diameter of the first inner surface 508 so as to permit the support member 530 to axially move within a corresponding portion of the bore 504 while minimizing radial movement within the corresponding portion of the bore 504. The support member 530 may comprise one or more threaded ports 531 for receiving one or more threaded bolts 532 to fixedly couple the upper electrical connector 528 to the support member 530 and, thus, in a predetermined position relative to the upper mechanical fastening means 512 of the upper interface.

The upper electrical connector 528 may comprise a plurality of sockets 534 electrically connected with the plurality of individual conductors of the electrical conductor 505. The plurality of sockets 535 may receive therein a plurality of pins from the upper or lower electrical connectors 212, 217 of the jarring tool 200, or from another portion of the tool string 110. Although one implementation of the upper electrical connector 528 is shown, the upper electrical connector 528 may be or comprise other electrical connectors known in the art, such as may be operable to mate or otherwise electrically connect with the electrical connectors 215, 217 of the jarring tool 200, the lower electrical connector (not shown) of the first portion 140, or an electrical connector of another portion of the tool string 110. In another implementation of the sensor tool 500, the upper electrical connector 528 may be omitted, wherein the individual conductors of the electrical conductor 505 may be spliced or otherwise connected with individual conductors of the electrical conductor 205 of the jarring tool 200 or another electrical conductor.

A lower end of the chassis 520 may comprise a receptacle portion 540 defining an open area or a cavity 538 containing the power source 524 and/or a container 542 containing the power source 524. The cavity 538 may have a substantially cylindrical shape, such as to permit the power source 524 and/or the container 542 to be slidably or otherwise disposed within the cavity 538. The receptacle portion 540 may have a substantially cylindrical shape, with an outer diameter that is sufficiently smaller than the outer diameter of the second inner surface 509 of the housing 502 so as to permit the receptacle portion 540 to axially move within a corresponding portion of the bore 504 while minimizing radial movement within the corresponding portion of the bore 504. An upper end of the receptacle portion 540 may comprise an edge or a shoulder 570, such as may contact the first shoulder 518 of the housing 502. The power source 524 may comprise one or more rechargeable batteries, such as lithium ion batteries, and/or other means known in the art, such as may be operable to store electrical energy for powering components coupled to the electronics boards 522, the accelerometer 526, and/or other electrical components.

One or more damping members 548 may be disposed within the cavity 538 between the receptacle portion 540 and the power source 524 and/or the container 542, such as may aid in damping and/or otherwise reducing shock transmitted to the power source 524 during jarring and other operations. The damping members 548 may comprise rubber, polyether ether ketone (PEEK), and/or other damping material.

The power source 524, the container 542, and the damping members 548 may be retained within the cavity 538 by a fastener 550 operable to engage the receptacle portion 540. The fastener 550 may be or comprise a threaded retaining ring having external threads operable to engage corresponding internal threads of the receptacle portion 540 and, thereby, prevent the power source 524, the container 542, and the damping members 548 from moving out of the cavity 538. One or more of the receptacle portion 540, the container 542, the damping members 548, and the fastener 550 may comprise one or more openings 552 extending therethrough, such as may permit leads, wires, and/or other electrical conductors 525 to extend from the power source 524 and communicate electrical power with at least one of the electronics boards 522, the accelerometer 526, and/or the electrical conductor 505 (such as to recharge the batteries of the power source 524).

Portions of the chassis 520 may further comprise cutout portions or channels 544 extending longitudinally with respect to the central axis 506. Such features 544 may, for example, permit the electrical conductor 505 to extend through the bore 504 between the housing 502 and the chassis 520 from the upper electrical connector 528 to the lower electrical connector 546.

In addition to (or instead of) using the power source 524 as the source of electrical power for the sensor tool 500, electrical power may be provided from the wellsite surface 105 to the sensor tool 500 via the conveyance means 160 and the electrical conductors 145, 205, 505. In such implementations, the sensor tool 500 may further comprise an electrical conductor 580 extending between the electrical conductor 505 and a power and communications interface 581 of at least one of the electronics boards 522. For example, individual wires of the electrical conductor 580 may be spliced or otherwise connected with selected individual conductors of the electrical conductor 505 within or at selected electrical sockets 534. The electrical power communicated through the conveyance means 160 and the electrical conductors 145, 205, 505, 580 may be utilized to operate electrical components of the sensor tool 500 and/or to reserve (or perhaps even recharge) the energy of the power source 524. In a similar implementation, the power source 524 may be omitted, wherein the electrical components of the sensor tool 500 may be powered solely from the wellsite surface 105 via the conveyance means 160 and the electrical conductors 145, 205, 505, 580.

The chassis 520 may further comprise one or more mounting plates 536 extending longitudinally within the bore 504 between the support member 530 and the receptacle portion 540. The mounting plates 536 may comprise one or more substantially planar surfaces, which may receive or abut one or more of the electronics boards 522. The mounting plates 536 may have sufficient thickness and/or strength so as to aid in preventing or minimizing flexing during jarring and other operations, which may aid in preventing or minimizing physical damage to the electronics boards 522.

The mounting plates 536 of the chassis 520 may comprise one or more openings (not shown) to receive one or more fasteners 554 operable to fixedly connect the electronics boards 522 to the mounting plates 536. The electronics boards 522 may comprise coupled thereto a processor 556, a memory device 558, and a plurality of sensors, such as a temperature sensor 560, a pressure sensor 562, and/or an inclination sensor 564. The electronics boards 522 may facilitate mounting of the sensors 560, 562, 564 on the chassis 520 and communication between the sensors 560, 562, 564, the processor 556, and the memory device 558. One or more of the sensors 560, 562, 564 may function as a detector for detecting a quality of an operating environment of the sensor tool 500, which may affect the measurement of the impact imparted by the jarring tool 200 during jarring operations. For example, during, prior to, or after the jarring operations, the sensors 560, 562, 564 may generate electrical output signals indicative of the quality of the operating environment, such as temperature, pressure, and inclination of the sensor tool 500. The output signals may be communicated to the processor 556 and the output signals or data generated by the processor may be stored on the memory device 558. This information may be utilized to calibrate the impact measurements obtained via the accelerometer 526.

The sensor tool 500 may further comprise a load cell 568 or another strain measuring sensor connected to the second inner surface 509 of the housing 502. The load cell 568 may be operable to measure strain within the housing 502 during jarring and other operations. The strain data generated by the load cell 568 may be utilized to calculate the forces imparted into the sensor tool 500 and, therefore, the second portion 150 of the tool string 110 during jarring and other operations.

The accelerometer 526 may be mounted on the housing 502, one of the electronics boards 522, or the chassis 520, including the mounting plates 536 and the receptacle portion 540. The accelerometer 526 may comprise a one, two, or three-axis accelerometer operable to measure acceleration/deceleration of the housing 502 of the sensor tool 500 along the central axis 506 of the sensor tool 500 and/or along axes perpendicular to the central axis 506. The central axis 506 may substantially coincide with the longitudinal axis of the wellbore 120. The accelerometer 526 is operable to measure acceleration ranging between about 2000 G and about 5000 G. That is, the accelerometer 526 does not measure the shock and/or acceleration of normal handling of the sensor tool 500 and non-jarring operations of the tool string 110, which are generally less than about 1000 G. The Applicant has determined that the accelerometers capable of accurately measuring the shock and/or acceleration of normal handling of the sensor tool 500 and non-jarring operations of the tool string 110 cannot also accurately measure the acceleration of jarring operations. Implementations within the scope of the present disclosure may also comprise multiple instances of the accelerometer 526, including implementations in which each accelerometer 526 may detect a different range of acceleration. The acceleration data generated by the accelerometer 526 may be utilized to calculate the impact forces imparted into the sensor tool 500 and, therefore, other portions of the tool string 110, during jarring operations.

The accelerometer 526 and the load cell 568 may be electrically or otherwise operably connected with at least one of the electronics boards 522 by leads, wires, and/or other electrical conductors 565 connected with another power and communications interface 566 of the electronics boards 522. The accelerometer 526 and the load cell 568 may generate electrical output signals indicative of quantities or parameters, such as acceleration and strain, experienced by the sensor tool 500 during jarring operations. The output signals may be communicated to the electronics boards 522, processed by the processor 556, and stored on the memory device 558.

Instead of storing the electrical output signals from the accelerometer 526 and/or the sensors 560, 562, 564, 568 on the memory device 558, the output signals may be communicated to the wellsite surface 105 in real-time through the electrical conductors 580, 505, 205, 145 and the conveyance means 160. For example, the output signals generated by the accelerometer and sensors described herein may be received by the electronics boards 522, processed, amplified, and communicated to the wellsite surface 105 through the electrical conductors 580, 505, 205, 145 and the conveyance means 160. Thereafter, the output signals may be analyzed at the wellsite surface 105 and/or recorded by the surface memory device 177. The electrical output signals may also be recorded by the downhole memory device 558 and simultaneously communicated to the wellsite surface 105, such as to be recorded by the surface memory device 177. The data stored on the memory device 558, communicated to the wellsite surface 105, and/or stored on the surface memory device 177 may include the raw data from the accelerometer(s) 526 and/or the sensors 560, 562, 564, 568, or processed data obtained utilizing the raw data, such as in implementations in which the raw data from the accelerometer(s) 526 is calibrated to account for the potentially extreme temperature, pressure, strain, and/or other factors of the operating environment downhole during jarring operations.

In the context of assembling the sensor tool 500 prior to incorporation into the tool string 110, the first and the second inner surfaces 508, 509 of the housing 502 may be substantially smooth and/or otherwise permit the chassis 520 to be slidably inserted and moved axially along the bore 504 until the shoulder 570 of the chassis 520 contacts the first shoulder 518 of the housing 502. Once fully inserted into the bore 504, the chassis 520 may be retained in the bore 504 by a fastener 572 operable to engage the chassis 520 and the housing 502. The fastener 572 may be or comprise a threaded retaining ring having external threads operable to engage corresponding internal threads of the housing 502 and, thereby, prevent the chassis 520 from moving out of the bore 504. Furthermore, the fastener 572 may comprise an opening 574 extending therethrough, such as may permit the electrical conductors 505, 525 to extend therethrough and electrically connect with the lower electrical connector 546.

Although FIG. 3 shows the chassis 520 as being a single, discrete member, the chassis 520 may also be formed from two or more separate and distinct portions. For example, the support member 530, the mounting plates 536, and the receptacle portion 540 may be separate and distinct portions coupled together via threaded engagement, fasteners, interference/press fit, and/or other fastening means.

As shown in FIG. 3, the lower electrical connector 546 may be operable to electrically connect the sensor tool 500 with the second portion 150 of the tool string 110. The lower electrical connector 546 may comprise a substantially cylindrical body and be disposed within the central bore 504 at or near the lower interface of the sensor tool 500. The lower electrical connector 546 may be disposed against the third inner surface 511 of the housing 502 and in contact with the second shoulder 519 protruding radially into the bore 504, such as to maintain the lower electrical connector 546 in a predetermined position with respect to the lower mechanical fastening means 514 of the lower interface. The lower electrical connector 546 may comprise a plurality of pins 578 extending therefrom and electrically connected with the plurality of individual conductors of the electrical conductor 505. The plurality of pins 578 may engage a plurality of sockets of the corresponding electrical connector (not shown) of the upper interface of the second portion 150 of the tool string 110. Although one implementation of the lower electrical connector 546 is shown, the lower electrical connector 546 may be or comprise other electrical connectors known in the art, such as may be operable to mate or otherwise electrically connect with the corresponding electrical connector of the upper interface of the second portion 150 of the tool string 110. The lower electrical connector 546 may also be omitted, such as in implementations in which the individual conductors of the electrical conductor 505 may be spliced or otherwise connected with individual conductors of the electrical conductor 155 of the second portion 150 of the tool string 110 or another electrical conductor.

In addition to the implementation shown in FIGS. 1 and 2, in which the sensor tool 500 is coupled below the jarring tool 200 (between the jarring tool 200 and the second portion 150 of the tool string 110), the sensor tool 500 may be coupled above the jarring tool 200, such as between the jarring tool 200 and the first portion 140 of the tool string 110. The sensor tool 500 may also be coupled between opposing portions of the first portion 140 of the tool string 110, between opposing portions of the second portion 150 of the tool string 110, above the first portion 140 of the tool string 110, or below the second portion 150 of the tool string 110. Multiple instances of the sensor tool 500 may also be incorporated into the tool string 110 at multiple locations, such as a first instance coupled between the first portion 140 of the tool string 110 and the jarring tool 200 and a second instance coupled between the jarring tool 200 and the second portion 150 of the tool string 110.

During operation of the tool string 110, the tool string 110 with the jarring tool 200 and the sensor tool 500 may be conveyed within the wellbore 120 that extends into the subterranean formation 130, as shown in FIG. 1. During such conveyance, the jarring tool 200 may be in the first configuration, as shown in FIG. 2, in which the detector 420 is detecting an electrical characteristic (e.g., current and/or voltage) from the electrical conductor 205, such as may be received via electronic communication with surface equipment 175 via the electrical conductor 145 of the first tool string portion 140 and the conveyance means 160. However, the jarring tool 200 may also be in the second configuration described above (not shown), in which the detector 420 is not detecting the electrical characteristic (or is detecting the absence of the electrical characteristic) from the electrical conductor 205. The operation of the jarring tool 200 may comprise actively setting or adjusting the jarring tool 200 between the first and second configurations, such as by operating the surface equipment 175 to establish the electrical characteristic detectable by the detector 420. During subsequent operations, the second tool string portion 150 may become lodged or stuck in the wellbore 120. Consequently, the jarring tool 200 may perform a power stroke when the jarring tool 200 is in either the first or second configuration.

During the power stroke, the tensioning device 170 of the surface equipment 175 is increasing the tension applied across the tool string 110 by pulling on the conveyance means 160. As the tension increases, the engagement between the female and male latch portions 275, 280 operates to overcome the biasing force of the upper and/or lower spring stacks 350, 355, thus causing the upper housing 242 to translate axially away from the lower housing 265. The tension is further increased in this manner by an amount sufficient for the blocking section 465 of the anti-release member 285 to emerge from within the ends of the flexible members 320 of the male latch portion 280, resulting in an impact actuation.

As stated above, such impact may be initiated in the first or "low-force" configuration of the jarring tool 200, when the detector 240 is detecting the electrical characteristic via the electrical conductor 205, or in the second or "high-force" configuration of the jarring tool 200 when the detector 240 is not detecting (or is detecting the absence of) the electrical characteristic. The resulting impact force is imparted to the lower tool string portion 150, such as along a load path extending from impact features 495 to the lower tool string portion 150 via the lower housing 265 and the housing 502 of the sensor tool 500.

In the first or "low-force" jarring tool configuration, the detector 420, the plunger 430, the mandrel 435, and/or the biasing member 460 may be collectively operated to move the blocking section 465 of the anti-release member 285 in the upward direction to decrease the distance 470 by which the upper and/or lower spring stacks 350, 355 may be compressed for the flexible fingers 320 to deflect radially inward and disengage from the female latch portion 275. Consequently, the upper ends of the flexible members 320 of the male latch portion 280 are able to deflect radially inward, thus permitting the disengagement of the female and male latch portions 275, 280, such that the upper housing 242 rapidly translates away from the lower housing 265 until one or more shoulders, bosses, flanges, and/or other impact features 490, connected to the shaft 270, collide with a corresponding one or more shoulders, bosses, flanges, and/or other impact features 495, connected to the third upper housing portion 260. During the jarring operations, one or more of the temperature sensor 560, the pressure sensor 562, the inclination sensor 564, the load cell 568, and the accelerometer 526 may generate one or more output signals relating to or indicative of the impact imparted by the jarring tool 200 and/or the current operating environment of the sensor tool 500, as described above. The output signals may be recorded on the downhole memory device 558 and/or communicated to the wellsite surface 105, such as to be recorded on the surface memory device 177.

Operation of the jarring tool 200 may comprise multiple iterations of the "low-force" power stroke and reengagement of the female and male latch portions 275, 280 until the impact force iteratively imparted to the second tool string portion 150 is sufficient to dislodge the second tool string portion 150. However, the impact force imparted to the second tool string portion 150 by the jarring tool 200, when operating the jarring tool 200 in the first configuration, may not be sufficient to dislodge the second tool string portion 150. In such situations, the jarring tool 200 may then be set or adjusted to the second or "high-force" configuration, as described above, in which the detector 420 is not detecting the electrical characteristic (or is detecting the absence of the electrical characteristic) from the electrical conductor 205, so as to produce a "high-force" power stroke. In the second configuration, the jarring tool 200 and/or tool string 110 may be "turned off" such that the electrical characteristic is not detected by the detector 240, causing the blocking section 465 of the anti-release member 285 to extend downwards further into the male latch portion 280 and therefore increase the distance 470. A greater tension may then be applied by the tensioning device 170 to the conveyance member 160 to compress the upper and/or lower spring stacks 350, 355 by the increased distance 470, such that the flexible fingers 320 may deflect radially inward and disengage from the female latch portion 275, thereby generating the "high-force" impact. Operation of the jarring tool 200 may then comprise multiple iterations of the "high-force" power stroke and reengagement the female and male latch portions 275, 280, until the impact force iteratively imparted to the lower tool string portion 150 is sufficient to dislodge the lower tool string portion 150.

Figure 5:
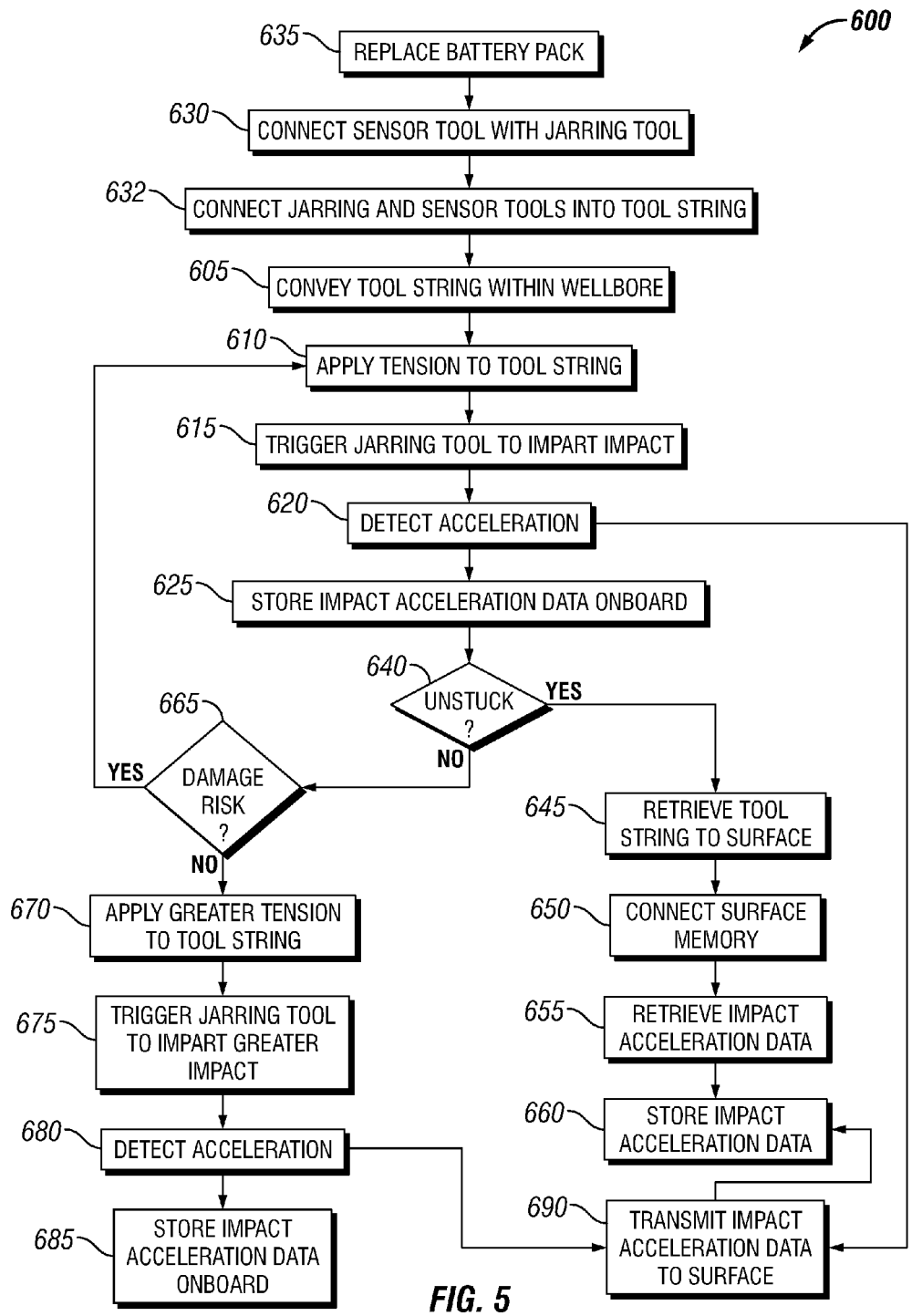
FIG. 5 is a flow-chart diagram of at least a portion of a method according to one or more aspects of the present disclosure.

FIG. 5 is a flow-chart diagram of at least a portion of an example implementation of a method 600 according to one or more aspects of the present disclosure. The method 600 may be utilized to operate a jarring tool and a sensor tool, such as at least a portion of the jarring tool 200 and the sensor tool 500 shown in one or more of FIGS. 1-4. Thus, the following description refers to FIGS. 1-5, collectively.

The method 600 may comprise conveying 605 a tool string 110 comprising a jarring tool 200 and a sensor tool 500 within a wellbore 120 and applying 610 tension to the tool string 110, ultimately including triggering 615 the jarring tool 200 to impart an impact to the tool string 110. As described above, the jarring tool 200 may comprise a housing and a shaft 270. The housing may comprise an upper housing 242 and a lower housing 265 slidably connected by the shaft 270, and triggering 615 the jarring tool 200 to impart an impact to the tool string 110 may comprise triggering the jarring tool 200 such that the upper housing 242 rapidly moves in an upper direction relative to the lower housing 265 until the upper and lower housings 242, 265 collide, thus generating the impact imparted to the tool string 110.

As described above, the sensor tool 500 may comprise one or more accelerometers 526, one or more environment sensors 560, 562, 564, 568, and a memory device 558. The method 600 also comprises detecting 620 acceleration during the impact, via the accelerometer(s) 526, and storing 625 impact acceleration data generated by the accelerometer(s) 526 on the memory device 558. The detected 620 and stored 625 data may also include data from one or more of the environment sensors 560, 562, 564, 568.

The method 600 may further comprise connecting 630 the sensor tool 500 with the jarring tool 200 prior to conveying 605 the tool string 110 within the wellbore 120. For example, the lower mechanical fastening means 218 of the jarring tool 200 may be connected to the upper mechanical fastening means 512 of the sensor tool 500, and the one or more lower electrical connectors 217 of the jarring tool 200 may be connected with the one or more upper electrical connectors 528 of the sensor tool 500. The one or more lower electrical connectors 217 of the jarring tool 200 may be connected with the one or more upper electrical connectors 528 of the sensor tool 500 prior to connecting the lower mechanical fastening means 218 of the jarring tool 200 to the upper mechanical fastening means 512 of the sensor tool 500, or connecting the lower mechanical fastening means 218 of the jarring tool 200 to the upper mechanical fastening means 512 of the sensor tool 500 may simultaneously connect the one or more lower electrical connectors 217 of the jarring tool 200 with the one or more upper electrical connectors 528 of the sensor tool 500.

The method may further comprise connecting 632 the connected 630 jarring and sensor tools 200, 500 into the tool string 110. For example, the upper mechanical fastening means 212 of the jarring tool 200 may be connected to a corresponding interface of the first portion 140 of the tool string 110, and the lower mechanical fastening means 514 of the sensor tool 500 may be connected to a corresponding interface of the second portion 150 of the tool string 110. Such connecting 632 would further comprise connecting the one or more upper electrical connectors 215 of the jarring tool 200 with a corresponding lower electrical connector of the first portion 140 of the tool string 110, and connecting the one or more lower electrical connectors 546 of the sensor tool 500 with a corresponding upper electrical connector of the second portion 150 of the tool string 110. As above, the electrical connection may be made before making the mechanical connection, or making the mechanical connection may simultaneously make the electrical connection.

The method 600 may further comprise replacing 635 the battery pack 524 by disconnecting and removing the battery pack 524 from the chassis 520 and inserting and connecting a replacement battery pack 524 into the chassis 520. Such battery replacement 635 would be performed prior to connecting 632 the connected 630 jarring and sensor tools 200, 500 into the tool string 110.

The method 600 may also comprise determining 640 whether the stuck portion of the tool string 110 has become dislodged or unstuck. If it is determined 640 that the stuck portion of the tool string 110 has become dislodged, the method 600 may comprise retrieving 645 the tool string 110 to the wellsite surface 105. The method 600 may then comprise electrically connecting 650 a surface memory device 177 with the sensor tool 500, retrieving 655 the impact acceleration data from the downhole memory device 558, and storing 660 the impact acceleration data on the surface memory device 177.

If it is determined 640 that the stuck portion of the tool string 110 has not become dislodged, the method 600 may comprise assessing 665 the risk of damage to the tool string 110 by impact acceleration forces, such as by comparing the acceleration caused by the impact to a predetermined level of acceleration that the tool string 110 can operationally withstand. If it is determined 665 that the acceleration caused by the impact is at or near the predetermined level, the impact may be repeated by again applying 610 the tension to the tool string 110, including ultimately triggering 615 the jarring tool again impart the impact to the tool string 110. However, if it is determined 665 that the acceleration caused by the impact is substantially less than the predetermined level (e.g., by at least about twenty percent), then a second tension that is greater than the first tension (e.g., by about ten percent) may be applied 670 to the tool string 110, including ultimately triggering 675 the jarring tool to impart a second, greater impact to the tool string 110. In such instances, the method 600 may also comprises detecting 680 the greater acceleration during the second, greater impact, via the accelerometer(s) 526, and storing 685 impact acceleration data generated by the accelerometer(s) 526 on the memory device 558. The detected 680 and stored 685 data may also include data from one or more of the environment sensors 560, 562, 564, 568.

As described above, the tool string 110 may further comprise one or more electrical conductors 145, 205, 505, 155 extending between the jarring tool 200, the sensor tool 500, and a wellsite surface 105. The method 600 may further comprise transmitting 690 the impact acceleration data from the sensor tool 500 to the wellsite surface 105 through the one or more electrical conductors 145, 205, 505, 155, and storing 660 the acceleration data on the surface memory device 177, after one or more of the impact generation 615, 675, whether instead of or in addition to connecting 650 the surface memory device 177 with the sensor tool 500 and retrieving 655 the impact acceleration data from the downhole memory device 558.

In view of the entirety of the present disclosure, including the figures and the claims, a person having ordinary skill in the art will readily recognize that the present disclosure introduces an apparatus comprising: a downhole tool comprising: opposing interfaces for incorporation of the downhole tool into a downhole tool string; a housing extending between the opposing interfaces, wherein a bore extends longitudinally through the housing between the opposing interfaces; an accelerometer disposed within the bore of the housing for detecting acceleration of the downhole tool in response to a mechanical impact generated elsewhere within the downhole tool string, wherein the accelerometer generates an output signal indicative of the acceleration; a processor for processing the output signal; a memory device for storing the output signal or data generated by the processor; and an electrical energy source powering the processor and the memory device.

The opposing interfaces may include mechanical fastening means integral to the housing. The mechanical fastening means may include threaded ends of the housing.

The downhole tool string may comprise a jarring tool and another downhole tool, and the opposing interfaces of the housing may be operable for coupling with respective ones of the jarring tool and the other downhole tool.

At least one of the opposing interfaces may comprise an electrical connector electrically connected with the processor, the memory device, and/or the electrical energy source, and the electrical connector may be operable for electrically connecting the downhole tool with another downhole tool of the downhole tool string.

The downhole tool may further comprise a chassis disposed within the bore of the housing, wherein the chassis may comprise a curved outer surface contacting a cooperatively curved inner surface of the housing, and wherein the accelerometer, the processor, and the memory device may be coupled to the chassis. The housing may comprise a shoulder extending radially into the bore and contacting the chassis to maintain an axial position of the chassis within the housing. The chassis may comprise a cavity, and the electrical energy source may comprise at least one battery received within the cavity.

The opposing interfaces may include an uphole electrical connector disposed proximate an uphole end of the housing and a downhole electrical connector disposed proximate a downhole end of the housing, and the downhole tool may further comprise an electrical conductor extending through the bore and electrically connecting the uphole and downhole electrical connectors. The uphole and downhole electrical connectors may be disposed within the bore of the housing. The downhole tool may further comprise a chassis disposed within the bore of the housing between the uphole and downhole electrical connectors, wherein the chassis may comprise a curved outer surface contacting a cooperatively curved inner surface of the housing, and wherein the accelerometer, the processor, and the memory device may be coupled to the chassis. The electrical conductor may extend through the bore between a wall of the housing and the chassis.

The downhole tool may further comprise a detector for detecting a quality of an operating environment of the downhole tool affecting the acceleration detected utilizing the accelerometer. The detector may be a temperature sensor.

The present disclosure also introduces an apparatus comprising: a jarring tool comprising: upper and lower jarring tool housings having respective jarring tool interfaces for incorporation of the jarring tool into a downhole tool string; and a shaft coupled with the lower jarring tool housing and extending into the upper jarring tool housing, wherein the upper jarring tool housing moves axially relative to the lower jarring tool housing along the shaft; and a sensor tool comprising: opposing sensor tool interfaces for incorporation of the sensor tool into the downhole tool string; a sensor tool housing extending between the opposing sensor tool interfaces, wherein a bore extends longitudinally through the sensor tool housing between the opposing sensor tool interfaces; an accelerometer disposed within the bore of the sensor tool housing for detecting acceleration in response to a mechanical impact generated by movement of the upper jarring tool housing away from the lower jarring tool housing until corresponding impact features of the upper and lower jarring tool housings collide, wherein the accelerometer generates an output signal indicative of the acceleration; a processor for processing the output signal; a memory device for storing the output signal or data generated by the processor; and an electrical energy source powering the processor and the memory device.

The opposing sensor tool interfaces may include mechanical fastening means integral to the sensor tool housing.

At least one of the opposing sensor tool interfaces may comprise an electrical connector electrically connected with the processor, the memory device, and/or the electrical energy source, wherein the electrical connector may be operable for electrically connecting the sensor tool with the jarring tool.

The sensor tool may further comprise a chassis disposed within the bore of the sensor tool housing, wherein the chassis may comprise a curved outer surface contacting a cooperatively curved inner surface of the sensor tool housing, and wherein the accelerometer, the processor, and the memory device may be coupled to the chassis. The chassis may comprise a cavity, and the electrical energy source may comprise at least one battery received within the cavity.

The sensor tool may further comprise a detector for detecting a quality of an operating environment of the sensor tool affecting the acceleration detected utilizing the accelerometer.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to permit the reader to quickly ascertain the nature of the technical disclosure. It is submitted with the understanding that it will not be used to interpret or limit the scope or meaning of the claims.

What is claimed is:

1. An apparatus, comprising:
    a downhole tool comprising:
        opposing interfaces for incorporation of the downhole tool into a downhole tool string;
        a housing extending between the opposing interfaces, wherein a bore extends longitudinally through the housing between the opposing interfaces;
        an accelerometer disposed within the bore of the housing for detecting acceleration of the downhole tool in response to a mechanical impact generated elsewhere within the downhole tool string, wherein the accelerometer generates an output signal indicative of the acceleration;
        a processor for processing the output signal;
        a memory device for storing the output signal or data generated by the processor; and
        an electrical energy source powering the processor and the memory device.

2. The apparatus of claim 1 wherein the opposing interfaces include mechanical fastening means integral to the housing.

3. The apparatus of claim 2 wherein the mechanical fastening means include threaded ends of the housing.

4. The apparatus of claim 1 wherein the downhole tool string comprises a jarring tool and another downhole tool, and wherein the opposing interfaces of the housing are operable for coupling with respective ones of the jarring tool and the other downhole tool.

5. The apparatus of claim 1 wherein at least one of the opposing interfaces comprises an electrical connector electrically connected with the processor, the memory device, and/or the electrical energy source, and wherein the electrical connector is operable for electrically connecting the downhole tool with another downhole tool of the downhole tool string.

6. The apparatus of claim 1 wherein the downhole tool further comprises a chassis disposed within the bore of the housing, wherein the chassis comprises a curved outer surface contacting a cooperatively curved inner surface of the housing, and wherein the accelerometer, the processor, and the memory device are coupled to the chassis.

7. The apparatus of claim 6 wherein the housing comprises a shoulder extending radially into the bore and contacting the chassis to maintain an axial position of the chassis within the housing.

8. The apparatus of claim 6 wherein the chassis comprises a cavity, and wherein the electrical energy source comprises at least one battery received within the cavity.

9. The apparatus of claim 1 wherein the opposing interfaces include an uphole electrical connector disposed proximate an uphole end of the housing and a downhole electrical connector disposed proximate a downhole end of the housing, and wherein the downhole tool further comprises an electrical conductor extending through the bore and electrically connecting the uphole and downhole electrical connectors.

10. The apparatus of claim 9 wherein the uphole and downhole electrical connectors are disposed within the bore of the housing.

11. The apparatus of claim 9 wherein the downhole tool further comprises a chassis disposed within the bore of the housing between the uphole and downhole electrical connectors, wherein the chassis comprises a curved outer surface contacting a cooperatively curved inner surface of the housing, and wherein the accelerometer, the processor, and the memory device are coupled to the chassis.

12. The apparatus of claim 11 wherein the electrical conductor extends through the bore between a wall of the housing and the chassis.

13. The apparatus of claim 1 wherein the downhole tool further comprises a detector for detecting a quality of an operating environment of the downhole tool affecting the acceleration detected utilizing the accelerometer.

14. The apparatus of claim 13 wherein the detector is a temperature sensor.

15. An apparatus, comprising:
    a jarring tool comprising:
        upper and lower jarring tool housings having respective jarring tool interfaces for incorporation of the jarring tool into a downhole tool string; and
        a shaft coupled with the lower jarring tool housing and extending into the upper jarring tool housing, wherein the upper jarring tool housing moves axially relative to the lower jarring tool housing along the shaft; and
    a sensor tool comprising:
        opposing sensor tool interfaces for incorporation of the sensor tool into the downhole tool string;
        a sensor tool housing extending between the opposing sensor tool interfaces, wherein a bore extends longitudinally through the sensor tool housing between the opposing sensor tool interfaces;
        an accelerometer disposed within the bore of the sensor tool housing for detecting acceleration in response to a mechanical impact generated by movement of the upper jarring tool housing away from the lower jarring tool housing until corresponding impact features of the upper and lower jarring tool housings collide, wherein the accelerometer generates an output signal indicative of the acceleration;
        a processor for processing the output signal;
        a memory device for storing the output signal or data generated by the processor; and
        an electrical energy source powering the processor and the memory device.

16. The apparatus of claim 15 wherein the opposing sensor tool interfaces include mechanical fastening means integral to the sensor tool housing.

17. The apparatus of claim 15 wherein at least one of the opposing sensor tool interfaces comprises an electrical connector electrically connected with the processor, the memory device, and/or the electrical energy source, and wherein the electrical connector is operable for electrically connecting the sensor tool with the jarring tool.

18. The apparatus of claim 15 wherein the sensor tool further comprises a chassis disposed within the bore of the sensor tool housing, wherein the chassis comprises a curved outer surface contacting a cooperatively curved inner surface of the sensor tool housing, and wherein the accelerometer, the processor, and the memory device are coupled to the chassis.

19. The apparatus of claim 18 wherein the chassis comprises a cavity, and wherein the electrical energy source comprises at least one battery received within the cavity.

20. The apparatus of claim 15 wherein the sensor tool further comprises a detector for detecting a quality of an operating environment of the sensor tool affecting the acceleration detected utilizing the accelerometer.

* * * * *